Sept. 18, 1956     R. J. COFFEY     2,763,768
WELDED JOINT AND METHOD AND APPARATUS FOR PRODUCING SAME
Filed April 28, 1953     4 Sheets-Sheet 1
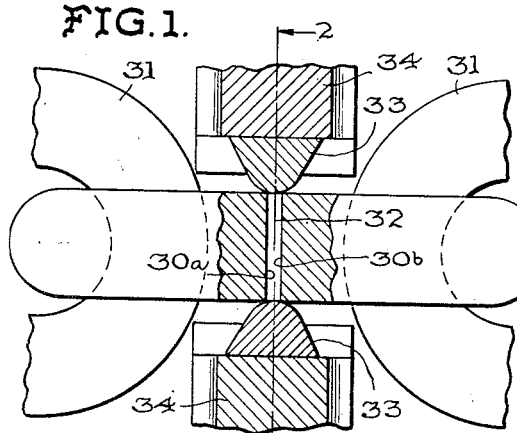
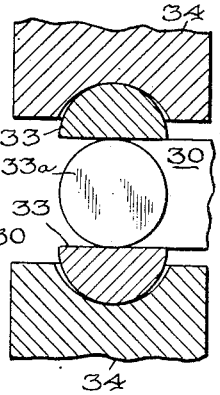
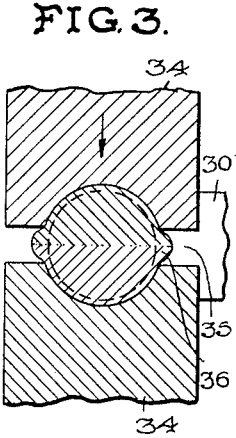
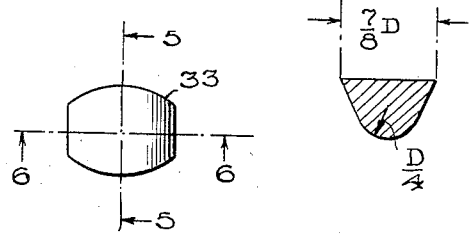
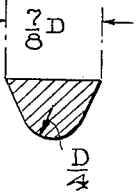
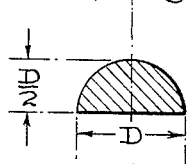
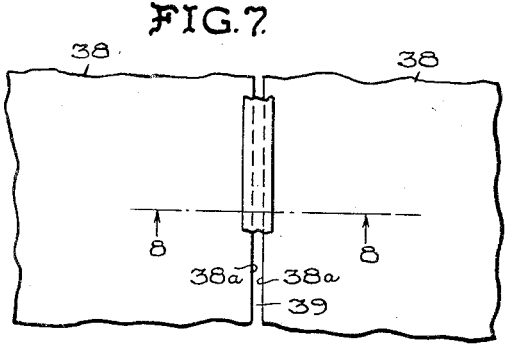
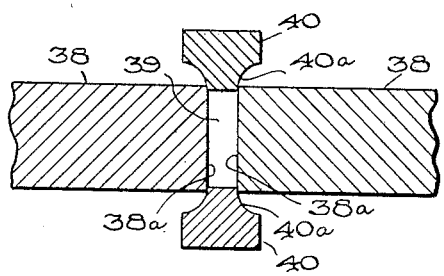
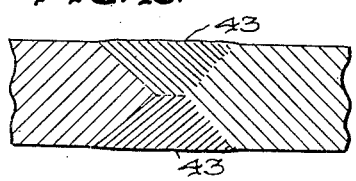
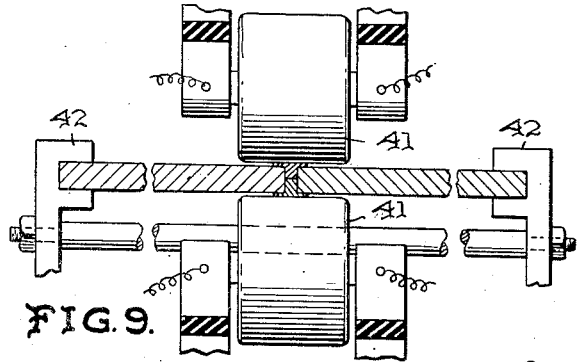
INVENTOR
RALPH J. COFFEY
BY
Pennie, Edmonds, Morton, Barrows & Taylor,
HIS ATTORNEYS.

Sept. 18, 1956 R. J. COFFEY 2,763,768
WELDED JOINT AND METHOD AND APPARATUS FOR PRODUCING SAME
Filed April 28, 1953 4 Sheets-Sheet 2
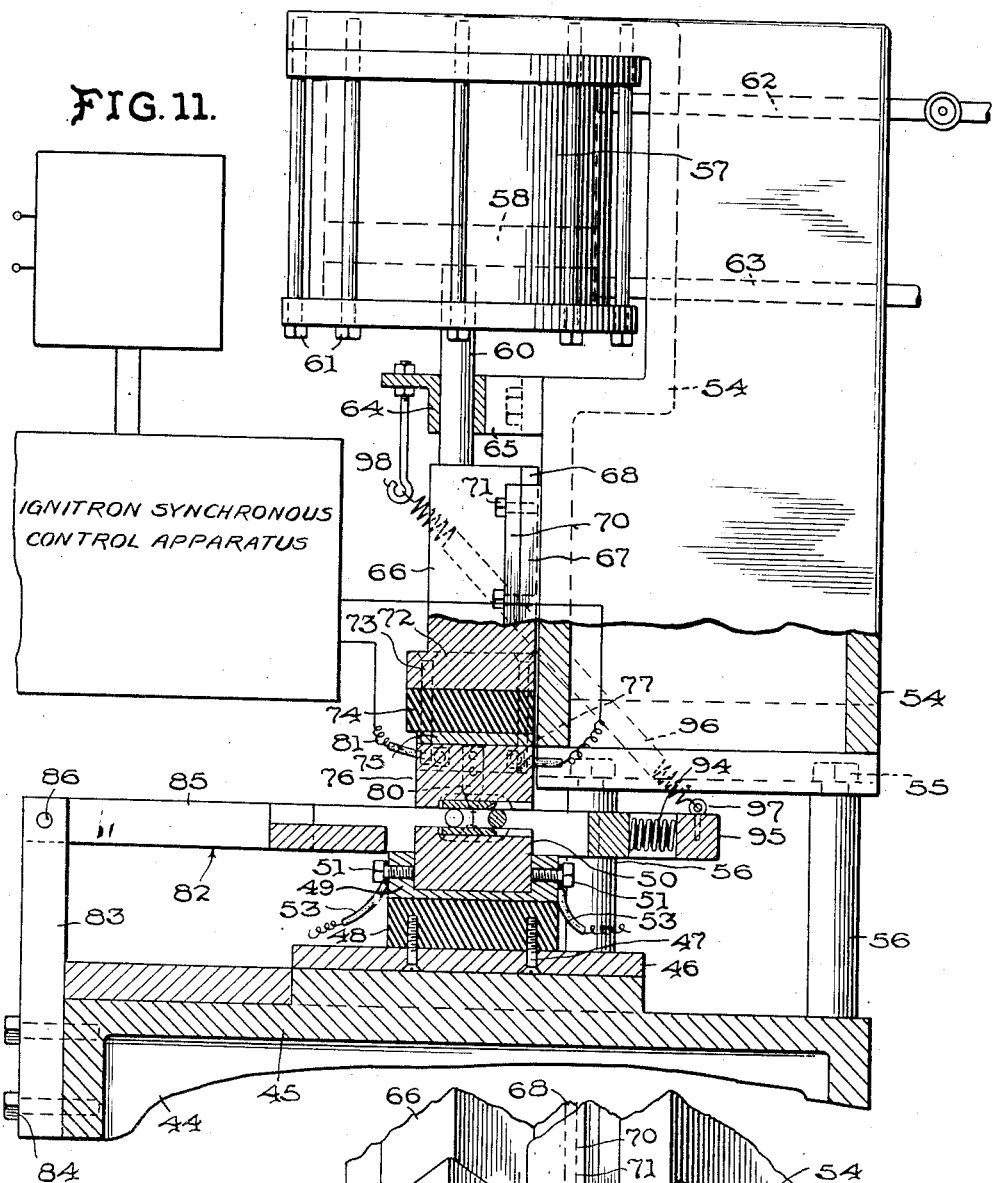
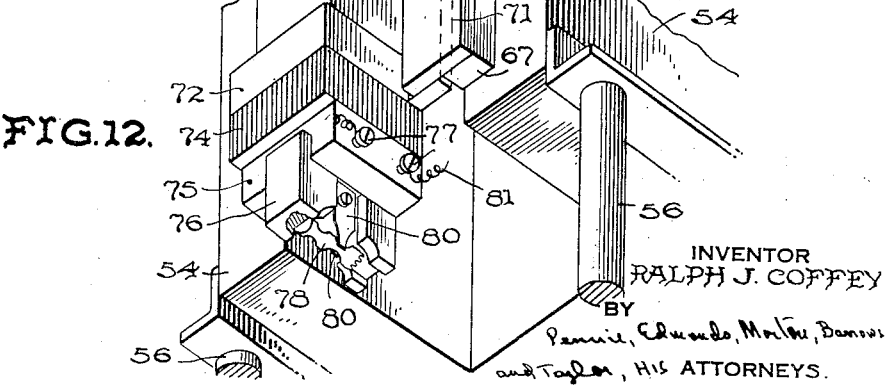
INVENTOR
RALPH J. COFFEY
BY
Pennie, Edmonds, Morton, Barrows
and Taylor, HIS ATTORNEYS.

Sept. 18, 1956 R. J. COFFEY 2,763,768
WELDED JOINT AND METHOD AND APPARATUS FOR PRODUCING SAME
Filed April 28, 1953 4 Sheets-Sheet 3
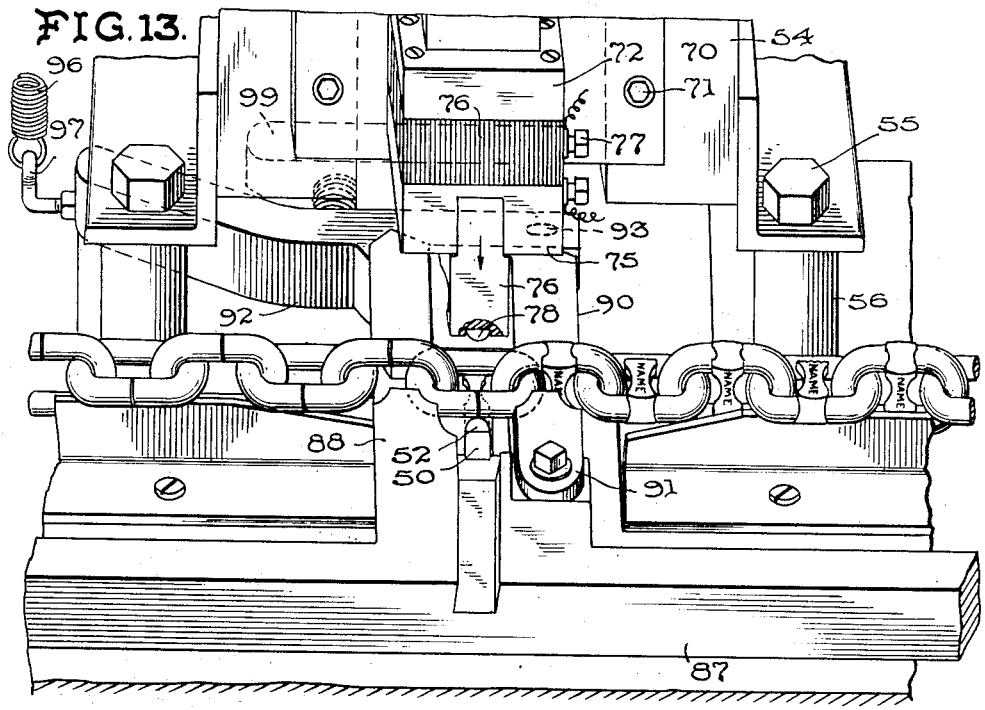
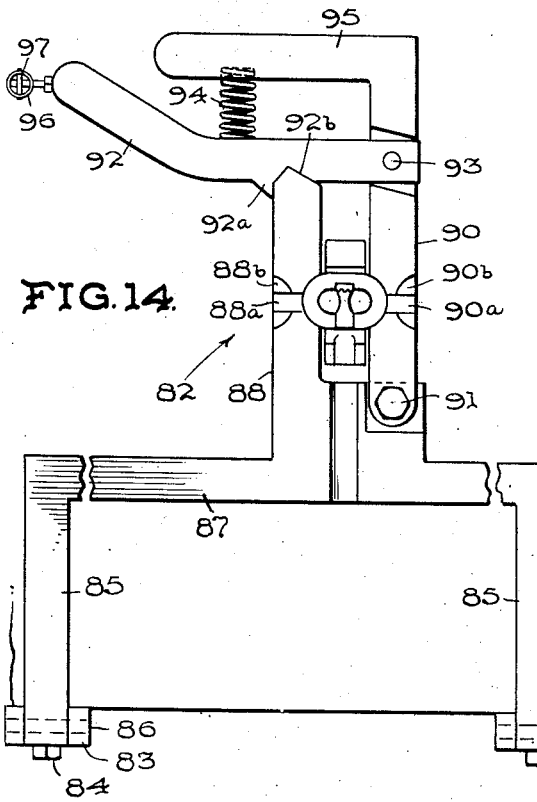
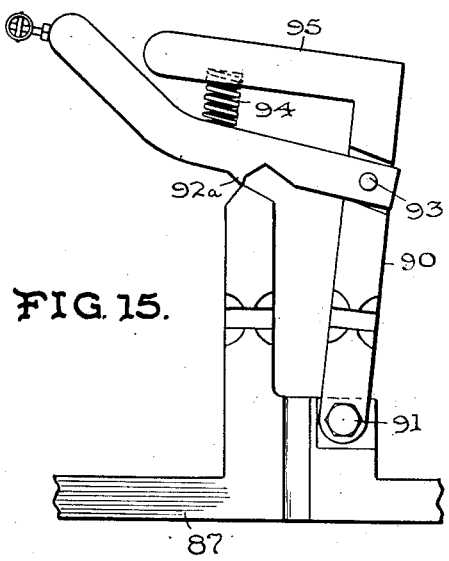
INVENTOR
RALPH J. COFFEY
BY
Pennie, Edmonds, Morton, Barrows & Taylor,
HIS ATTORNEYS.

Sept. 18, 1956 R. J. COFFEY 2,763,768
WELDED JOINT AND METHOD AND APPARATUS FOR PRODUCING SAME
Filed April 28, 1953 4 Sheets-Sheet 4
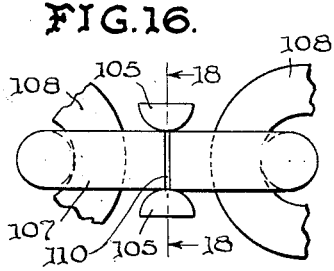
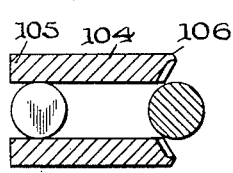
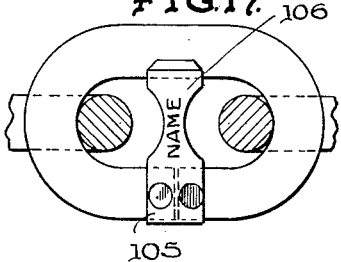
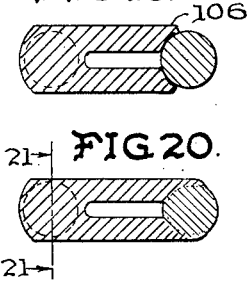
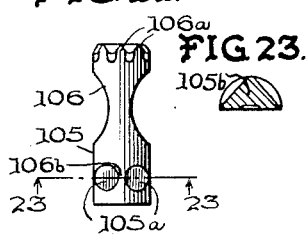
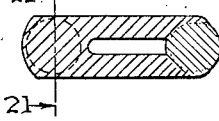
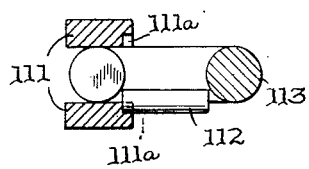
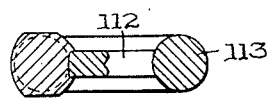
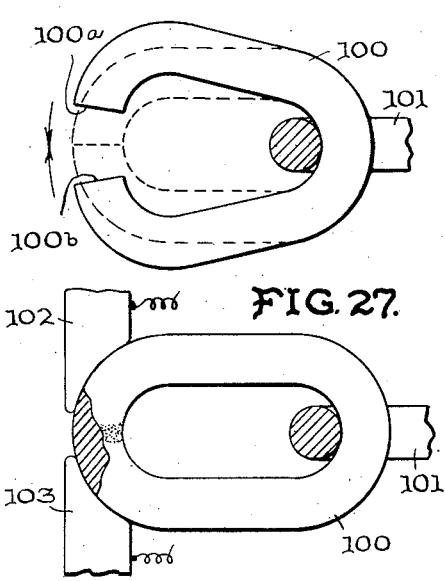
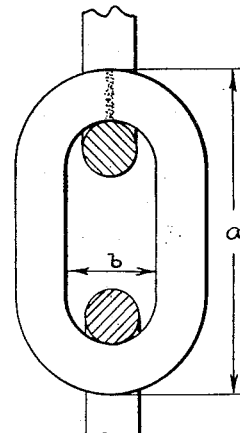
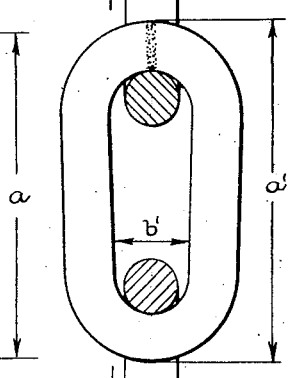
INVENTOR
RALPH J. COFFEY
BY
Pennie, Edmonds, Morton, Barrows & Taylor,
HIS ATTORNEYS

United States Patent Office 2,763,768
Patented Sept. 18, 1956

2,763,768

WELDED JOINT AND METHOD AND APPARATUS FOR PRODUCING SAME

Ralph J. Coffey, York, Pa., assignor to American Chain & Cable Company, Inc., Bridgeport, Conn., a corporation of New York Application April 28, 1953, Serial No. 351,630

14 Claims. (Cl. 219—51)

This invention relates to resistance welding, and in particular to a new method of producing welded joints, which I have termed "cross-gap deep penetration welding" or, more conveniently, simply "cross-gap welding."

Cross-gap welding is a method of joining together the opposite faces of a gap in which those faces are held firmly, i. e, with substantial restraining force, against relative movement and one or more "slugs" are forced into the gap transversely thereof by applied pressure while a welding current is being passed through the slug and parent metal immediately adjacent the gap faces. The method produces a welded joint of characteristic cross-section in which the area of the interfaces between parent metal and weld is greater than the area of the original gap faces, analogous to a scarf joint, but without any preshaping of the gap faces.

The invention was conceived in the course of research undertaken to improve the characteristics of resistance-welded steel chain. In the resistance welding procedures heretofore commonly employed in the steel chain industry, the practice has been to insert a link (which has been interlinked with the necessary adjacent links and partly closed by bending) into a fixture having electrodes so arranged that mechanical pressure applied to them will tend further to close the gap in the link. Pressure is applied to the electrodes bringing the ends to be welded together into current carrying contact, and, at the same time, welding current is passed through those ends by means of the electrodes, according to well-established principles. Under the influence of pressure and current, the abutting joint ends soften, become incandescent, and are upset somewhat. Then, in the usual practice, the current is turned off, one or more hammer blows are struck transverse the joint, the pressure is released from the electrodes, and the link is removed from the fixture.

Because absolute dimensional stability of successive unwelded links cannot economically be achieved, certain variables are present in this procedure. As examples: the gap distance is not constant from link to link, and, therefore, the application of a constant predetermined pressure to the electrodes does not produce identical effects on successive links; electrode contact is not assured of being identical on successive links, and the phenomenon of electrode burns of "stings" is fairly common; and the area of contact between the abutting faces to be joined may not be uniform, with the result that neither the rate nor the distribution of the softening effect are uniform. It has not been found feasible, therefore, to have fully automatic control of this operation, and the operator is required to exercise judgment in controlling the passage of current and the application of pressure, and he must be especially careful in controlling the length of time during which current is allowed to flow.

As a result of these variables, the resulting welds are not uniform in quality. It is axiomatic that a chain is only as strong as its weakest link. If a weld of maximum quality has been achieved, the welded joint is not the weakest point of the link, and when tested to destruction, the link will break at some point in the parent metal, rather than in the joint. However, such perfect welds are not always accomplished, and often one or more weaknesses are present in some degree.

One of the most troublesome problems is preventing electrode stings on the link. If such a sting has occurred, it creates a point of maximum stress that may not be immediately apparent, but which develops rapidly after the chain has been subjected to repeated stress. Inspection of all joints is difficult to accomplish economically, and despite the greatest care of trained operators, welded joints of the type known in the trade as "pasters" will occur in finished chains. This type of weld is one in which the metal of the two opposing surfaces has not flowed together properly, and, when the weld is broken, the surfaces of the material look smooth and glossy. These pasters sometimes can be detected by a limited form of proof testing, which means applying a predetermined load to a length of chain, constructed in the ordinary manner. The applied load is less than that which will stress all the material of the finished link past its yield point. It is usually such as to produce a permanent elongation of the chain of 2–5% only through change in link shape. If this limit is much exceeded, the chain, although perfect, will "pull stiff"; that is, the links will be deformed so that there is sufficient binding between them to reduce flexibility, although they do not break.

The load which can be applied to chain during proof test without damaging the chain is materially increased by the use of stud links. With conventional methods of production, however, stud-link chain is a great deal more expensive than ordinary open-link chain. It is one of the advantages of my invention that stud-link chain can be very economically produced. An additional advantage flowing from the use of stud-link chain is that trademark and other identifying data can be imprinted upon the studs, without weakening the chain. It has not been found feasible so to mark the load carrying portions of ordinary open link chains, because of weakening due to notch effect. In addition to the commercial advantage of trademark identification, grade marks, which are of considerable utility in identifying chain after years of service, can be applied to studs.

In the use of my invention, electrode stings are eliminated, the harmful effect of the many variables is materially reduced, if not eliminated, the application of studs is made economical, and a better metallurgical joint is obtained with far more uniformity of excellence. This is reflected in the fact that with conventional methods of resistance welding, side-welded chain (chain in which the welded joints are at the sides of the links) is considered by many engineers as unsuitable for use in sling chains, where the side portions of the individual links may be subject to a considerable bending stress. The reason for this is that many welds, which are but little better than pasters, will display considerable strength in tension, and so will pass conventional proof tests which impose only tensional stresses, but will fail almost immediately under relatively light bending loads. It is obviously impractical to test commercial chains by imposing bending loads of the necessary magnitudes on each of the successive links in the length of chain. To meet this difficulty, many companies supply end-welded chain for sling chain use, which must be built up link by link, and, therefore, is slower to produce and consequently more expensive. In end-welded chain, the welded joint is at the end of the link, where, in all services, it is subjected principally to a load in tension. By the use of my invention, however, side-welded chain can be produced, with the attendant economies of that form, which can be safely employed for sling chain service.

As applied to chain, my new method comprises holding the unjoined abutting ends of the formed link firmly against motion relative to each other, laying slugs of metal of predetermined shape and character on each side of the gap between them in opposed relationship, and applying pressure to the slugs to press them together, while, at the same time, passing a welding current through them. As a result of this operation, the slugs and the edges of the gap are softened and upset together, and the gap is completely filled, the slugs and the metal which forms the sides of the gap melting together to make a weld of excellent quality. It will be perceived that the shape of the slugs and the electrodes may be so adjusted to particular circumstances that the pressure between them is uniform, and electrode stings are entirely obviated. The pressure applied to the electrodes, the amount of current passing between them, and the time during which the welding takes place can be regulated. It will also be appreciated that the metallurgical characteristics of the material employed for the slugs can be varied to suit the exigencies of a given application. If desired, the slugs can extend beyond the gap in the direction of the other side of the link, so that, when the portion of the slugs that closes the gap has been pressed into the welded position, the extensions form a stud, and on these extensions trademark and other identifying data may be preprinted.

For a fuller understanding of my invention and detailed embodiments thereof, reference may be made to the accompanying drawings, in which:

Fig. 1 is a side view, with parts broken away and shown in section, of a chain link prior to welding according to my invention, and showing the slugs and electrodes in pre-welding position;

Fig. 2 is a sectional view taken on line 2—2 of Fig. 1;

Fig. 3 is a sectional view similar to Fig. 2, showing the weld completed;

Fig. 4 is an end view of a form of slug which may be used in my new process;

Fig. 5 is a sectional view taken on the line 5—5 of Figs. 4 and 6;

Fig. 6 is a sectional view taken on the line 6—6 of Fig. 4;

Fig. 7 is a plan view showing the application of my new method to welding together the ends of flat plates, the parts being shown in position prior to welding;

Fig. 8 is a sectional view taken on the line 8—8 of Fig. 7;

Fig. 9 is a vertical sectional view, showing the method of completing the weld between the elements shown in Figs. 7 and 8;

Fig. 10 is a sectional view similar to Fig. 8, showing the weld completed;

Fig. 11 is a diagrammatic side view, with parts shown in section, of one form of chain welding apparatus by means of which my new method may be practiced;

Fig. 12 is a perspective view, taken from below, of the upper electrode of the apparatus illustrated in Fig. 11;

Fig. 13 is a fragmentary front perspective view of the apparatus of Fig. 11, with a chain link in place for welding;

Fig. 14 is a detailed plan view of the link-holding clamp used in the apparatus of Fig. 11, with the clamp shown in closed position with a link secured therein;

Fig. 15 is a plan view of the clamp of Fig. 14 in the open position;

Fig. 16 is a side view of a chain link prepared for side welding, according to my invention, into a stud link, with the studs shown in prewelding position;

Fig. 17 is a plan view of the link and studs shown in Fig. 16;

Fig. 18 is a sectional view taken on the line 18—18 of Fig. 16;

Fig. 19 is a sectional view similar to Fig. 18 showing the link after the principal welding operation has been completed;

Fig. 20 is a sectional view similar to Fig. 19 showing the link after the free ends of the studs have been tack-welded in position;

Fig. 21 is a sectional view taken on the line 21—21 of Fig. 20;

Fig. 22 is a plan view of the underside of one form of stud slug;

Fig. 23 is a sectional view taken on the line 23—23 of Fig. 22;

Fig. 24 is a sectional view similar to Fig. 18, showing another form of stud and slugs prior to welding;

Fig. 25 is a sectional view similar to Fig. 24 showing the stud and slugs after welding;

Fig. 26 is a top view of a chain link before end welding;

Fig. 27 is a top view showing the method of welding the link of Fig. 26 by conventional methods;

Fig. 28 is a top view of the link illustrated in Fig. 27 after completion of the weld; and Fig. 29 is a top view of the link of Fig. 28, showing the distortion produced by proof testing.

In Figs. 1–3, inclusive, my novel method of welding is illustrated as applied to the side welding of a conventional link of chain. However, it is understood that the description may apply to the welding of any two members having opposed surfaces that may be connected by a system of suitably shaped penetrating slugs. A conventional formed chain link 30, which has been inter-linked with adjacent links 31, is secured in a holder (not shown). The link 30 has been prepared for side welding in the usual manner, and is retained in the holder with its abutting ends 30a and 30b spaced apart to define a gap 32. Two bluntly wedge-shaped slugs 33, of either the same or a different type of metal from the link, are positioned on the top and bottom of the link in alignment with the gap 32, and diametrically opposed to one another. An electrode 34 is in contact with each slug, and clips (not shown) or other convenient means may be provided to retain the slugs in the electrodes. The electrodes are adapted for straight line or radial motion toward and away from each other, and the shape of their inner surfaces corresponds to the shape of the outer surfaces of the slugs, so that the maximum area of electrical contact is obtained between each slug and its corresponding electrode.

In the welding operation, pressure is applied in a direction to force the electrodes directly toward one another, and the welding current, flowing through the slugs and the metal of the link adjacent the gap, causes the slugs and the metal of the link to soften and upset together. When the slugs have been moved inwardly to the point where a sufficient hydraulic pressure is created in the softened metal, the two slugs and the parent metal of the link will have flowed together to form a weld of excellent quality. The maximum strength is obtained when the entire inter-face gap is filled with softened metal under this pressure as it will be if the slugs penetrate deeply enough to touch each other. As shown in Fig. 3, the electrodes are not moved entirely together, but a space 35 is left between their opposing faces in order to prevent pressure on the flash 36 formed at the weld.

Figs. 3–6 inclusive, illustrate one form of slug which may be used in my novel process. It is understood that slugs of various shapes and sizes may be employed and that the form shown and described is only one of the many possible forms. The dimensions of the slug may bear various relationships to the diameter of the pieces being joined, the dimensions being determined largely on an empirical basis. However, in Figs. 5 and 6, I have given the approximate dimensions of the typical slug there shown, in terms of the diameter D of the round, flat surfaces being joined. It is also noted that, when using a slug having the stated dimensions, the gap between the members being joined should be approximately equal to $$\frac{D}{7}$$

The exact volume and configuration of slugs are not critical, and I have found that the cross-section of the resulting joint is characteristically "hour-glass," as shown in Figs. 10 and 21, whenever a slug of acceptable volume relative to the volume of the adjacent parent metal is used, without significant variation on account of changes in configuration. I have successfully welded links of wire diameters from ¼" to ¾" and slugs of the proportions shown will produce excellent welds over this range, though so, no doubt will many other specific slug forms. In general, slug configuration should be such as to promote firm and uniform contact with both parent metal and electrode and to facilitate penetration of the gap. Slug mass should be proportioned to parent metal mass so that the welding current used will soften each approximately equally. Too light a slug will melt before the parent metal softens and vice versa. In neither case will proper upset pressures be transmitted to the weld area and satisfactory results will not be attained. I know of no critical size limit on the joints that can be made by this method, it being a valid generality that, all other things being equal, the larger the joint, the longer the welding time.

My novel method of welding may also be applied with great effectiveness to the joining of flat members, as shown in Figs. 7–10, inclusive. Flat plates 38 are held securely with the edges 38a to be joined parallel and spaced apart to create a gap 39. Slugs, in the form of T-section rods 40, are positioned above and below the gap with the leg portion 40a of each rod entering the gap. The welding operation may be performed by a seam welder of the usual type, having opposed roller electrodes 41, and guides 42, which serve to maintain the plates 38 in proper position. As the plates and rods, positioned as shown in Fig. 8, are advanced through the welder, the roller electrodes exert pressure inwardly on the rods 40 and simultaneously pass a welding current between the rods. Thus, a weld is formed between the rods and the plates 38, in a manner similar to that described with reference to Figs. 1–3, inclusive. The spacing between the roller electrodes 40 is slightly greater than the thickness of the plates 38, in order to provide space for the flash 43, and prevent the metal from being expelled. Of course, the flash may be removed by conventional means, if desired, after the weld is completed.

It will now be apparent that by the use of my novel method a weld can be obtained which is superior to the conventional upset weld in many respects. In the usual methods of resistance welding, electrode burns or a paster may result if the welding current is too high and the weld made too fast. Therefore, the heating must be relatively slow, and many metallurgical transformations in the link between the electrodes result therefrom. With my process, electrode burns are eliminated because of the straight-line motion of the electrodes toward each other, and the constant area of contact between each electrode and its associated slug. The welding current flows only through the slugs and the metal of the link close to the gap. Therefore, higher currents and greater pressures may be used to complete the weld in a shorter period of time, with greatly lessened metallurgical transformations. Any metallurgical disturbance which may occur in or adjacent to the weld does not extend so far that it seriously impairs the flexure and ductility of the weld area. In conventional butt welding, the essential upset is made axially against plastic backing rather than against solid backing, which is deleterious to the adjacent-to-weld parent metal. With my novel process, the upset is made against solid backing, that is, from the gap outwardly toward the solid link, and at the area of maximum moment, the weld is sheathed with parent metal.

As an important result of the favorable characteristics of my method, many materials hitherto thought difficult or impossible to weld by resistance methods can now be easily and reliably welded. By way of example, I have welded successfully and easily chain links of low and high carbon steels, various common alloy steels, stainless steels (for specific example, 18–8, titanium stabilized), special alloy steels (for specific example, 16–25–6 Cr-Ni-Mo), and non-ferrous metals (for specific example, 8% aluminum bronze). There is nothing critical about the parameters of my method as applied to any of the materials I have so far tested. By purely empirical methods, the correct electrode pressures, current value, and time are determined. As a generality, I have found that greater pressure and current and a shorter time are required for "difficult" materials than for those traditionally easy to weld. It is an advantage of my method that such empirical determinations can be rapidly and accurately made because the variables of the method are all subject to close control, the "wild" variables of previous resistance welding techniques being eliminated. A further and similar advantage stemming directly from the characteristics of my method is reduced "set-up" time and expense preparing for production welding of new articles. For example, in order to set-up a conventional resistance welder for a new size of chain link, actual links have to be tested because the current flow is materially affected by the configuration of the whole link and so is the application of pressure. With my method, in contrast, only scrap ends of the wire forming the links need be used. Current flow and pressure application being cross-gap, any pieces of the wire long enough to contain the zone affected by heat during the welding cycle may be used to form the test gaps. On large articles to be welded this may be of greatest importance, and economically controlling.

The cross-gap method of welding produces a joint of characteristic cross-section. Etched specimens of these joints are shown in Figs. 10 and 21. One important characteristic of a cross-gap welded joint is the relatively small amount of parent metal that is heat affected. Another is the hour-glass shape of the heat affected metal. This weld zone thus has a considerably greater area of interface with the unaffected parent metal than the area of the right cross-section of the parent wire. It is not unlikely that this produces a scarf effect as the joint is remarkably strong in resisting all sorts of stress.

I have also provided a novel form of apparatus, shown in Figs. 11–15 inclusive, which may be conveniently used to practice my new method of welding. Essentially, the apparatus comprises upper and lower electrodes, which hold the slugs prior to and during the welding operation, a source of welding current connected to the electrodes, and means for holding the link to be welded between the electrodes. The lower electrode is fixed in position, and the upper electrode is mounted for straight-line movement toward and away from the lower electrode, and means are provided for exerting downward pressure on the upper electrode during the welding operation.

As best seen in Fig. 11, the machine includes a base structure 44 having a top wall 45 on which are supported the majority of the components of the apparatus. A plate 46 is mounted on the top wall, and screws 47 extend upward through the plate to secure an insulating block 48 to its upper surface, and an electrode-retaining block 49, having a slot cut in its upper surface, is secured to the insulating block 48. The lower electrode 50 of the apparatus is mounted in the slot of the electrode-retaining block 49, and is secured therein by screws 51, which extend through the opposite sides of the block and bear against the electrode. The upper surface of the electrode is shaped to receive a slug 52 therein, and retain it in position for welding, in the manner previously described. The screws 51 may also serve as electrical contacts and have leads 53 secured thereto, the leads serving to connect the lower electrode to the welding current supply, which, in this form of apparatus, is an ignitron synchronous control apparatus of conventional type.

An upper electrode and means for exerting downward pressure on the electrode are carried by a frame structure 54 which is attached by screws 55 to pillars 56 secured to the top wall of the base. A pneumatic cylinder 57, having a piston 58 and a piston rod 60, is secured to the upper portion of the frame by tie bolts 61, with the piston rod 60 being reciprocal in a vertical direction. Air supply lines 62 and 63, connected into the cylinder above and below the piston, respectively, provide means for moving the piston up and down in the well-known manner, and control of the air supplied to the lines from a compressor source (not shown) may be either manual or semi-automatic, as desired. The piston passes through a sleeve bearing 64, mounted in a bracket 65, which is secured to the frame 54 below the cylinder, and the lower end of the piston carries a head 66. The head 66 is mounted for vertical sliding movement with the piston rod and secured against rotational or transverse movement by means of slides, comprising guides 67 attached to the frame, which engage surfaces 68 formed on the head, the head being retained in the slides by a plate 70 secured to each guide 67 by screws 71. A mounting block 72 is secured to the lower end of the head 66 and screws 73 through the mounting block secure an insulating block 74 thereto. A slotted electrode-retaining block 75 is attached to the insulating block 74, and an upper electrode 76 is mounted in the slot in the block 75 and secured therein by screws 77, which extend through the sides of the block 75 and bear against the electrode. The upper electrode 76 is similar to the lower electrode 50 previously described, and its lower surface is so shaped that a slug 78 may fit therein. However, because gravity would cause the slug to fall out of the upper electrode, leaf springs 80 are provided on each side of the electrode to grip the slug and retain it in position, with good electrical contact between the slug and the electrode. The screws 77, which hold the electrode in place, may also serve as electrical contacts, and have leads 81 attached thereto, which extend to the source of welding current previously mentioned.

It is apparent that the upper electrode 78 and the lower electrode 50 are removably secured in their mountings. Therefore, electrodes suitable for welding with various types and sizes of slugs and at various locations on a link may be used in the apparatus. In Figs. 11, 12, and 13, I have shown electrodes designed for use in side-welding a stud-link chain of a type which will be later described in detail.

Means are provided to hold securely the chain link to be welded in the proper position between the electrodes, and, in this instance, comprise a novel clamp 82, which is secured between upright bars 83 attached to the front of the base of the apparatus on each side of center by screws 84. The upper end of each bar 83 is bifurcated and an arm 85 of the clamp is mounted in the end of each bar on a pivot pin 86 for pivotal movement of the clamp about a horizontal axis. As best seen in Figs. 14 and 15, a cross piece 87 joins the arms 85, and a fixed arm 88 extending inwardly therefrom. A movable arm 90 lies alongside the fixed arm 88, and is pivotable about a vertical axis defined by an eccentric pin 91, which attaches the movable arm to the cross piece 87. A latch arm 92, which extends across the inner end of the fixed arm 88, is pivotally secured to the movable arm 90 by a pin 93, and a protrusion 92a is formed adjacent a cutout 92b in the latch arm, these elements cooperating with the upper end of the fixed arm 88 to provide means for fixing the position of the movable arm with respect to the fixed arm. The ends of a coil spring 94 bear against a transverse portion 95 of the movable arm and against the latch arm 92, and the spring urges the latter toward the end of the fixed arm 88 and into latched position. A spring 96 is connected between a hook 97 on the end of the latch arm 92 and a hook 98 carried by the bracket 65, and serves to partially counterbalance the weight of the clamp.

The fixed arm 88 and the movable arm 90 have coaxial slots 88a and 90a, respectively, and semi-circular recesses 88b and 90b, respectively, cut into their upper surfaces. When the movable arm is latched, the opposing semi-circular recesses in the fixed and movable arms receive the ends of a link which is to be welded and hold it securely, while the two links on each side of the clamped link lie in the slots and outer recesses (Fig. 13). The eccentric pin 91 may be adjusted for minor variations in link sizes to insure that the link will be firmly held by the clamp.

The clamp is mounted in such a position that, when a link is secured therein for welding, the gap in the formed link is directly in line between the slugs held by the upper and lower electrodes, and the link rests on the lower slug so that it enters the gaps, so far as is possible. The clamp described is designed for holding a link which may be side-welded. However, the clamp may be modified to hold a link in any desired position, such, for example, as for end-welding.

In making a weld in the side of a link of chain with the form of apparatus described, assuming it to be the first link to be welded, the first step is to place two slugs in position facing each other, one in the lower electrode and the other between the leaf springs of the upper electrode. The link to be welded is then secured in the clamp 82. Air is provided through the supply line 62 to the cylinder 57 to move the piston rod 60 and the parts carried by it downwardly until the slug held in the upper electrode bears against the link adjacent the gap. At this time, the welding current is turned on and pressure built up in the cylinder to urge the upper electrode and slug downwardly. The flow of welding current through the slugs and link adjacent the gap, and the simultaneous application of pressure to the upper slug causes the slugs and metal of the link to soften and upset together. Because the clamp which holds the link is pivotable, it also moves downwardly as the lower slug enters the gap, and maintains a position mid-way between the two slugs. When the upper slug has moved downwardly to the point where it touches the lower slug, the two slugs and the parent metal of the link have flowed together and the weld is completed. At this time, the welding current is turned off and air supplied to the cylinder through line 63 to move the upper electrode away from the link. The clamp which holds the link may then be manually unlatched by moving the latch arm 92 toward the transverse arm 95, and the welded link removed. If the formed links of a chain are being welded, rather than a separate link, the chain may be rotated 90° on its axis and moved along, so that the next link may be secured in welding position in the clamp.

Despite the mass of data available concerning the theoretical aspects of welding, actually producing a good weld requires considerable experimentation. It has thus far been extremely difficult, if not impossible, to follow an exact setup and obtain the exact predicted result, because the variables which enter into any welding process are so many as to be almost incapable of definition. For example, my new method of welding is influenced strongly by the following factors, which are only a few of those known to be important:

(a) The types of material used in making a weld;
(b) The shape of cross-section of the slug to be welded;
(c) The welding pressure;
(d) Type of current control;
(e) Machine characteristics such as mechanical inertia, electrical impedances, etc.;
(f) Time duration of the weld;
(g) Cleanliness of material;
(h) Preparation of the butted faces.

My new method is much less sensitive to many of these variables than are prior methods, but it is still extremely difficult, if not impossible, to give specific data regarding current, pressure, etc., which will apply to more than a single machine or a single type of metal of a given size. It has been found that the setup which produces a perfect weld with one machine will not produce a like weld with an identically constructed machine, because of inherent differences in mechanical inertia, electrical resistance, and others of the variables mentioned.

I have found by experimentation, however, that an excellent weld can be made, according to my method with the machine described, on ⅞" round low carbon content soft steel of the usual variety and slugs of the same material, with the following machine setup:

(a) Initial electrode pressure: 2863 pounds;
(b) Open circuit voltage of the welding transformer secondary winding: 10.18 volts;
(c) Time duration of weld: 2.62 seconds (157 cycles of 60-cycle alternating current).

It has also been found that the following setup is satisfactory for welding this material when in the form of 15/32" wire:

(a) Initial electrode pressure: 2863 pounds;
(b) Open circuit voltage of the welding transformer secondary winding: 7.95 volts;
(c) Time duration of weld: 0.617 second (37 cycles of 60-cycle alternating current).

It will be apparent from the time durations set forth above that a weld may be completed, using my novel process, in a time substantially less than that required in conventional methods of resistance butt welding. For example, in welding the ⅞" round material, the time required by my process is only 2.62 seconds, while with previously known methods the time required is of the order of 7 to 10 seconds. With the smaller material, a weld may be made using my process in approximately 0.6 second, while prior methods require about 5 seconds.

It is cautioned, however, that the data given above should be used merely as a guide, and a perfect weld should not be expected merely because the machine is set up according to this data. In setting up any machine for welding, it is generally necessary to determine the exact settings for the machine by experimentation. The first welds made are tested according to the loading which will be put on the finished weld (such as flexure, tension, tortion or a combination of these), and the setup varied until a satisfactory weld is obtained. When the weld is tested in the proper manner until the link or bar is broken, the parent metal from either the slug or the parent metal should be "pulled," so that the fracture opens in a fibrous-looking manner (that is, if the weld itself breaks at all). If the parting of the material looks smooth and glossy, the weld is a paster and the setup should be varied somewhat. A paster is caused by the pressure being too high or the welding current too low, which results in the parent metal and the slug being merely upset and not flowing together. The proper correction procedure, assuming that the time duration of the weld must remain constant for metallurgical reasons, is to reduce the welding pressure to the minimum required for complete followup of the weld, and make another weld. If, on the second weld, fluid or plastic metal is expelled from the weld area, the pressure is too low, and a third weld should be made at a pressure between the pressures of the first and second welds. Generally, the third attempt will result in the proper setup for the machine.

Open link chain of the conventional variety has a disadvantage in that only a limited proof test may be applied thereto without damaging the chain. Figs. 26 and 27 illustrate the formation of a chain by a conventional method of end-welding the links. A link 100, which is formed from wire of the desired diameter, must be interlinked with an adjacent link 101 after the adjacent link has been welded, while the ends 100a and 100b of the unwelded link are in the position shown in solid lines in Fig. 26, before they are brought together as shown in broken lines. After the ends are brought together, electrodes 102 and 103 are placed in contact with the ends of the link and pressure applied to the electrodes to urge the ends 100a and 100b together, while welding current passes therebetween, and the weld is completed. When the link has been welded, it has an oblate shape in plan, and is of outside major length a, and inside minor width b, as seen in Fig. 28. When a chain made up of end-welded open links is subjected to a proof test, such as is often required by a buyer, the link will be deformed by the application of more than a certain testing force. As shown in Fig. 29, the length of the link is then increased from a to a', and is decreased from b to b'; that is, the link has been distended lengthwise. The distortion of the links before rupture, if the welds are all good, will be great enough to cause b' to be so diminished as to cause adjacent links to bind. When this occurs, the chain is said to have been "pulled stiff."

This type of distortion may be eliminated and the force employed in proof testing without harm to the chain greatly increased by providing a stud which extends across the link between the sides, as is well known in the art. With conventional welding processes, stud-link chain is considerably more expensive to manufacture than is open-link chain, because of the additional operation required to weld the stud in position in the link. My new method of welding permits stud links to be produced economically, and in some instances, only a single operation is required to weld the gap in the link and weld the stud in position. In addition, side-welded chain produced by my process is of a quality comparable to end-welded chain, and, by providing a side-welded stud-link in the manner to be described, all the advantages of end-welded stud-link chain are obtained.

Stud-link chain may be produced by my new method, by using an "extended slug," one form of which is shown in Figs. 22 and 23. The extended slug 104 there shown, comprises an end portion 105, which corresponds to the slug described in connection with Figs. 1–6, inclusive, and an extension 106, which serves as a stud to bridge the space between the sides of the link. The slug portion 105 is of half-round shape and has notches 105a cut into its cylindrical surface to provide a small area 105b, which acts as a wedge and enters the gap first. The end of the stud portion 106 is beveled to fit against the cylindrical surface of the link opposite the gap, and is grooved to provide lands 106a which lie in contact with the surface before they are welded thereto. The flat outer surface of the slug provides a convenient area on which trademark or grade-marks may be stamped or printed.

The process of welding a stud link 107, by my new method, which is shown in Figs. 16–21, inclusive, is similar to that previously described for welding with simple slugs. The link 107 to be welded is formed in the usual manner, interlinked with adjacent link 108, and the abutting ends of the link spaced apart by an air gap 110. Two slugs 104 are positioned facing each other above and below the gap in the manner previously described, and are retained in electrodes, such, for example, as those shown in Figs. 11–14, inclusive, which have surface shaped to receive the slugs and maintain good electrical contact with them. As the electrodes move toward each other and welding curent is passed between them, the slug portions 105 of the slugs move inwardly into the gap and a weld is produced (Fig. 19) in the manner previously described. The ends of the stud portions 106 may be welded to the opposite side of the link at this same time, or may merely rest against the opposite side as shown in Fig. 19. In this case, the free ends may later be welded in place by any simple convenient process, such, for example, as by spot welding or tack welding.

Another form of slug and stud suitable for making stud link chain by my new method is shown in Figs. 24 and 25. In this modification, the extended slug is replaced by two slugs 111 which may be similar to the slugs 33 shown in Figs. 4–6, and a cylindrical stud 112, whose length is equal to the spacing between the opposite sides of the link 113. A semi-circular recess 111a is provided in the inner end of each slug, and the end of the stud 118 fits into the circular recess formed thereby when the slugs have been welded into position by means of my novel method, as previously explained. The end of the slug is welded to the metal about the recess in the act of welding the link, and the other end of the stud may be left unwelded, being subject only to compression stresses.

It will now be apparent that I have provided a new and advantageous method of resistance welding, a new apparatus for performing the welding operation according to my method, and a new welded joint and several novel chain links produced thereby. Welding by means of my method prevents electrode burns on the link arising from imperfect electrode seating during pressure application, and thus eliminates one of the most troublesome features of conventional welding. The metallurgical disturbances created in any welding process are held to a minimum with my process, because the welding current flows through only a small segment of the parent metal directly adjacent the gap which is being welded. Therefore, the occurrence of paster is greatly reduced, and a side-welded chain link made according to my method is reliable in applications previously supplied only in end-welded links in the best practice. The new process is much less sensitive to the many variables involved in welding, and good welds may be made in links which are prepared in such a manner that welding by conventional methods would have been impossible. In addition, stud-linked chain, which can withstand much greater loads than open-link chain, may be produced conveniently and inexpensively by the use of my new method. The "hour-glass" section of a characteristic cross-gap weld is inherently stronger and more resistant to a greater variety of stresses than other resistance welded joints.

I claim:

1. A method of welding a seam between two edges of metal which comprises holding the unjoined seam edges against motion relative to each other, positioning slugs of metal too large to fit into said seam on opposite sides thereof, and applying opposing rolling pressure to said slugs to force them into said seam while simultaneously passing a welding current through a first of said slugs only, said first slug, said edges, the second of said slugs, and a second electrode in contact with said second slug only, the relative volumes of said edges, said seam and said slugs being so mutually proportioned that the resulting welded joint has a characteristic substantially double-scarf-like configuration with parent-metal to weld-metal interface areas substantially in excess of the original areas of the edges which have been joined.

2. A machine for cross-welding including, in combination, a frame, a jig carried by said frame for holding elements to be welded against motion relative to each other, a first electrode carried by said frame so arranged and positioned relative to said jig that it can be brought into contact with a slug positioned to enter the discontinuity between said elements on one side thereof, a second electrode carried by said frame so arranged and positioned relative to said jig that it can be brought into contact with a slug positioned to enter said discontinuity on the opposite side thereof, power-driven means carried by said frame for moving one of said electrodes directly toward the other, and a source of welding current connected across said electrodes.

3. The machine of claim 1 in which the jig is constructed as a quick-release clamp.

4. The machine of claim 1 in which the jig is attached to the frame by spring means.

5. The machine of claim 1 in which an electrode is provided with slug-retaining means.

6. The machine of claim 1 in which the power-driven means includes a source of air under pressure and a pneumatic piston-and-cylinder press.

7. A method or resistance welding for joining two elements by closing a discontinuity between them which comprises holding said elements fixed against motion relative to each other in the desired space relation in which they are to be joined, positioning a slug of metal too large to fit into the discontinuity between said elements across one side thereof, and applying pressure to said slug in a direction to force it into said discontinuity in contact with both of said elements while passing a welding current through a first electrode in contact with said slug only, said slug, the opposing faces of said discontinuity, and a second electrode electrically connected to said opposing faces on the side of said discontinuity away from said slug, the relative volumes of said elements, said discontinuity and said slug being so mutually proportioned that the resulting welded joint has a characteristic substantially scarf-like configuration with parent-metal to weld-metal interface areas substantially in excess of the original areas of the discontinuity surfaces which have been joined.

8. A method of resistance welding for joining two elements by closing a discontinuity between them which comprises holding said elements fixed against motion relative to each other in the desired space relation in which they are to be joined, positioning a slug of metal too large to fit into the discontinuity between said elements across each of two opposite sides thereof, and applying opposing pressures to said slugs in directions to force them toward each other and into said discontinuity in contact with both of said elements while passing a welding current via a first electrode in contact with one of said slugs only and a second electrode in contact with the other of said slugs only, the relative volumes of said elements, said discontinuity and said slugs being so mutually proportioned that the resulting welded joint has a characteristic substantially double scarf-like configuration with parent-metal to weld-metal interface areas substantially in excess of the original area of the discontinuity surfaces which have been joined.

9. A method of resistance welding for joining the ends of a piece of wire which has been formed into a chain link which comprisees holding said ends against motion relative to each other, positioning a slug of metal too large to fit into the discontinuity between said ends across each of two opposite sides thereof, and applying opposing pressures to said slugs in directions to force them toward each other and into said discontinuity in contact with both of said ends while passing a welding current via a first electrode in contact with one of said slugs only and a second electrode in contact with the other of said slugs only, the relative volumes of said wire, said discontinuity and said slugs being so mutually proportioned that the resulting welded joint has a characteristic substantially double scarf-like configuration with parent-metal to weld-metal interface areas substantially in excess of the original areas of the wire ends which have been joined.

10. A chain link welded by the method of claim 9.

11. A chain link welded by the method of claim 9 in which at least one of the slugs extends across the link from the welded joint and engages the portion of the link opposite thereto.

12. A chain link welded by the method of claim 9 in which a stud extending across the link from the welded joint and engaging the portion of the link opposite thereto is welded between the slugs.

13. A method of producing a welded joint having a cross section on a plane perpendicular to the joint faces in which the interfaces between parent metal not affected by heat and heat-affected metal intersect to make a substantially hourglass figure comprising positioning slugs of metal too large to enter the joint when cold on opposite sides of said joint parallel thereto, applying pressure to said slugs to force them into said joint, and simultaneously passing a welding current from one of said slugs to the other through said joint faces.

14. A welded joint produced by the method of claim 13.

References Cited in the file of this patent

UNITED STATES PATENTS

| | | |
|---|---|---|
| 915,249 | Thompson | Mar. 16, 1909 |
| 984,719 | Thomson | Feb. 21, 1911 |
| 1,022,712 | Thomson | Apr. 9, 1912 |
| 1,038,604 | Lachman | Sept. 17, 1912 |
| 1,510,197 | Ryan | Sept. 30, 1924 |
| 1,674,109 | Grob | June 19, 1928 |
| 2,108,077 | Robinson | Feb. 15, 1938 |
| 2,265,943 | Laig | Dec. 9, 1941 |

FOREIGN PATENTS

| | | |
|---|---|---|
| 614,746 | France | Sept. 24, 1926 |
| 479,785 | Germany | Jan. 12, 1927 |